(12) United States Patent
Craine et al.

(10) Patent No.: US 7,162,063 B1
(45) Date of Patent: *Jan. 9, 2007

(54) DIGITAL SKIN LESION IMAGING SYSTEM AND METHOD

(75) Inventors: Eric R. Craine, Tucson, AZ (US); Brian L. Craine, Fairfax, CA (US)

(73) Assignee: Western Research Company, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/899,499

(22) Filed: Jul. 26, 2004

Related U.S. Application Data (60) Provisional application No. 60/490,827, filed on Jul. 29, 2003.

(51) Int. Cl.
*G06K 9/00* (2006.01)

(52) U.S. Cl. ........................ 382/128; 128/922

(58) Field of Classification Search ............... 382/128, 382/129, 130–132; 358/473; 424/646
See application file for complete search history.

(56) References Cited

U.S. PATENT DOCUMENTS

| | | | |
|---|---|---|---|
| 4,905,702 A * | 3/1990 | Foss ........................... | 600/476 |
| 6,081,611 A * | 6/2000 | Linford et al. .............. | 382/128 |
| 6,215,893 B1 * | 4/2001 | Leshem et al. ............. | 382/128 |
| 6,427,022 B1 | 7/2002 | Craine et al. ............... | 382/128 |
| 2002/0186875 A1 * | 12/2002 | Burmer et al. .............. | 382/133 |
| 2004/0264749 A1 * | 12/2004 | Skladnev et al. .......... | 382/128 |

\* cited by examiner

*Primary Examiner*—Brian L. Casler
*Assistant Examiner*—John F. Ramirez
(74) *Attorney, Agent, or Firm*—Cahill, von Hellens & Glazer P.L.C.

(57) ABSTRACT

New or significantly changed skin lesions are detected by providing digital baseline image data of an area of a subject's skin by placing a calibration piece on the area and then positioning a digital camera to frame the area within a field of view of the camera and digitally photographing the area to produce a digital baseline image of the area. The digital baseline image is downloaded from the camera to a computer, which digitally filters the baseline image to produce a partially transparent baseline image scaled to fit over a viewfinder display of the camera. The filtered baseline image is printed on a transparent sheet to produce template. Substantially later, a calibration piece is placed on the area, and the template is placed over the viewfinder display of the camera. The camera is positioned to frame that area within the field of view so as to align a live image of the area with the baseline image on the template. The area is photographed to produce a digital current image thereof. The current image is downloaded to the computer, which is operated to alternately display the aligned current image data and the baseline image data to allow visual identification of lesions which changed enough in the "alternating image comparison display" to identify a new or significantly growing lesion.

9 Claims, 9 Drawing Sheets

DIGITAL SKIN LESION IMAGING SYSTEM AND METHOD

CROSS REFERENCE TO RELATED APPLICATION

This application claims the benefit of prior filed co-pending U.S. provisional application Ser. No. 60/490,827 filed Jul. 29, 2003 entitled "Digital Skin Lesion Imaging System and Method" by Eric R. Craine and Brian L. Craine.

BACKGROUND OF THE INVENTION

The invention relates to a computer imaging system and method for detecting new skin lesions and significant changes in existing skin lesions.

It is well known that rapid changes in the size of a mole or skin lesion may indicate the onset of precancerous or cancerous tissue growth and that early detection of such changes usually results in a much better prognosis for the patient, especially if the lesion is a melanoma. In the case of a melanoma, a delay of a month or two in detection may make the difference between successful treatment or death of the patient. Unfortunately, most people have difficulty detecting early changes in the size of a skin lesion because initial changes in size are slow and subtle. Furthermore, a physician observing a lesion usually does not have prior "baseline" or reference information on the lesion from which to judge the amount or rate of its growth.

Because there is no generally effective treatment for metastatic melanoma, even small cancers often prove fatal if not detected early. This is unfortunate, because few cancers provide a greater opportunity for early discovery and removal than melanoma, because cutaneous melanoma (1) is located on the skin surface where it is readily observed, and (2) usually undergoes an easily observable "radial growth" phase prior to metastasis. The radial growth stage of a cancerous skin lesion therefore provides a window of opportunity during which the lesion can be detected and removed before metastasis, with a high probability of a complete cure.

The closest prior art is believed to include our publication "Video Comparator System for Early Detection of Cutaneous Malignant Melanoma", SPIE vol. 1653/Image Capture Formatting, and Display (1992). Various difficulties were encountered in providing a practical implementation of the basic technique described in that article using a microcomputer-based video imaging system for storing an image archive of historical reference images for each patient, registering and scaling current images with baseline images, and using an "alternating image comparison display" comparison of the image pairs in a manner that is readily acceptable by and useable by patients. Those difficulties led to our development of the invention disclosed in our U.S. Pat. No. 6,427,022 "Image Comparator System and Method for Detecting Changes in Skin Lesions", filed Nov. 10, 1988 and issued Jul. 30, 2002, and incorporated herein by reference. In the system disclosed in the '022 patent, two buffers were included that allowed a previously stored digitized baseline image of a portion of a subject's body and a corresponding current "live" image to be alternately displayed so that good registration/alignment between the baseline image and the current image could be achieved by manipulating the video camera being used. However, we learned that in a clinical setting the spatial resolution of the images acquired in this manner was poor. In order to achieve the resolution required to adequately resolve small moles and lesions, it was found to be necessary to make a large number of small-format digital images which had to be very precisely matched and/or aligned using the alternate display technique. But that was found to be impractical in a clinical setting because the procedure is very labor-intensive and time-consuming. Later we tried using the same basic technique to digitize segments of the images on high-resolution film, which allowed some of the labor-intensive part of the process to be performed in a laboratory instead of in a clinical setting.

However, it clearly is highly desirable to be able to perform the technique of identifying significant new lesions or changes in existing lesions without the necessity of a labor-intensive, time-consuming "intermediate service" operation being included in the process.

There clearly is a great need, which up to now has not been fulfilled, for an inexpensive, workable, accurate system and convenient technique by which ordinary people with access to a digital camera can conveniently monitor the growth of skin lesions on their entire bodies in the privacy of their own homes and reliably determine which lesions have grown significantly and which are new and submit such information to a dermatologist who can then expertly observe new lesions and lesions which have significantly changed since a prior examination.

There is an unmet need for an inexpensive, workable, accurate, convenient system for providing an objective comparison of many or all lesions on a subject's body irrespective of whether the lesions are "suspect" or likely to be cancerous.

There is an unmet need for an inexpensive, workable, accurate, convenient system for providing an objective comparison of many or all lesions on a subject's body while avoiding difficulties inherent in the use of photographic film.

There is an unmet need for an inexpensive, workable, accurate, convenient system for aligning and comparing images of current skin lesions with images of baseline skin lesions and thereby improving the likelihood of detecting significant changes in skin lesions.

There is an unmet need for an inexpensive, workable, accurate, convenient system that makes it easy for untrained subjects to align current lesion images in the field of view of an ordinary digital camera with corresponding baseline lesion images.

SUMMARY OF THE INVENTION

Accordingly, it is an object of the invention to provide an inexpensive, easily used system/method for detecting new skin lesions and/or skin lesions which have grown significantly.

It is another object of the invention to provide such a system for establishing a baseline record of image data of initial skin conditions and providing a meaningful comparison of later images of the same skin areas with the baseline images so as to readily and accurately identify all new lesions or pre-existing lesions which have significantly grown.

It is another object of the invention to provide such a system that allows patients with access to a digital camera to simply take photographs of their skin in the privacy of their homes and to use ordinary personal computers to identify new or significantly growing lesions on their bodies on the basis of the information in such photographs and then be able to submit this information to a dermatologist with confidence that they have accurately identified new or significantly growing lesions.

It is another object of the invention to provide a quick, convenient way to align a current image of a skin lesion in good registration/alignment with a baseline image of the same skin lesion at the time the current image is made, without introducing distortions in either image.

It is another object of the invention to provide an inexpensive, workable, accurate, convenient research tool to enable study and quantification of the natural history of skin lesions and the effects of various skin treatments on the human skin and lesions thereon.

It is another object of invention to provide an inexpensive, workable, accurate, convenient system that makes it easy for untrained subjects to align current lesion images in the field of view of an ordinary digital camera with corresponding baseline lesion images by providing automatic scaling of the current lesion images and corresponding baseline images.

It is another object of invention to provide an inexpensive, workable, accurate, convenient system that makes it easy for untrained subjects to align current lesion images in the field of view of an ordinary digital camera with corresponding baseline lesion images by providing high precision "local" alignment of selected portions of the current lesion images with similar portions of corresponding baseline lesion images.

Briefly described, and in accordance with one embodiment, the present invention provides a method of identifying new or significantly changed skin lesions by providing digital baseline image data of an area of a subject's skin, by performing the steps of positioning a digital camera to frame the area within a field of view of the camera and digitally photographing the area to produce a digital baseline image of the area, and downloading the digital baseline image from the camera to a computer. The computer is operated to produce a partially transparent or semi-transparent baseline image that is scaled to fit over a viewfinder display of the camera. A printer coupled to the computer is operated to print the baseline image on a relatively transparent sheet to produce a baseline image template. The digital current image data of the area of the subject's skin is provided a substantial amount of time later by performing the steps of placing the template over the viewfinder display of a digital camera which may be the same as or different than the digital camera used to photographing the baseline image, positioning that digital camera to frame an area within the field of view of that digital camera so as to align a current live image of the area with the baseline image on the template, digitally photographing the area to produce a digital current image of the area, and downloading the digital current image from that digital camera to the computer. The computer is operated to alternately display the aligned current image data and the baseline image data on a monitor coupled to the computer to aid visual identification of lesions which are new or have significantly grown.

In the described embodiment, new or significantly changed skin lesions are detected by providing digital baseline image data of an area of a subject's skin by placing a calibration indicia on the area and then positioning a digital camera to frame the area within a field of view of the camera and digitally photographing the area to produce a digital baseline image of the area. The digital baseline image is downloaded from the camera to a computer, which digitally filters the baseline image to produce a partially transparent or semi-transparent baseline template image scaled to fit over a viewfinder display of the camera. The filtered baseline image is printed on a transparent sheet to produce a template. Substantially later, a calibration indicia is placed on the area, and the template is placed over the viewfinder display of the camera. The camera is positioned to frame that area within the field of view so as to align a live image of the area with the baseline template image on the template. The area is photographed to produce a digital current image thereof. The current image is downloaded to the computer, which is operated to alternately display the aligned current image data and the baseline image data to allow visual identification of lesions which appear sufficiently different to identify a new or significantly growing lesion.

DETAILED DESCRIPTION OF THE PREFERRED EMBODIMENTS

In attempting to solve the above mentioned problems regarding clinical use of the system described in our above-mentioned U.S. Pat. No. 6,427,022, we found that we could make large-format images with improved, inexpensive digital cameras which are now available instead of using a film camera, although the problem of precise registration/alignment of baseline images and current images to be alternately displayed nevertheless remained unsolved.

Figure 1:
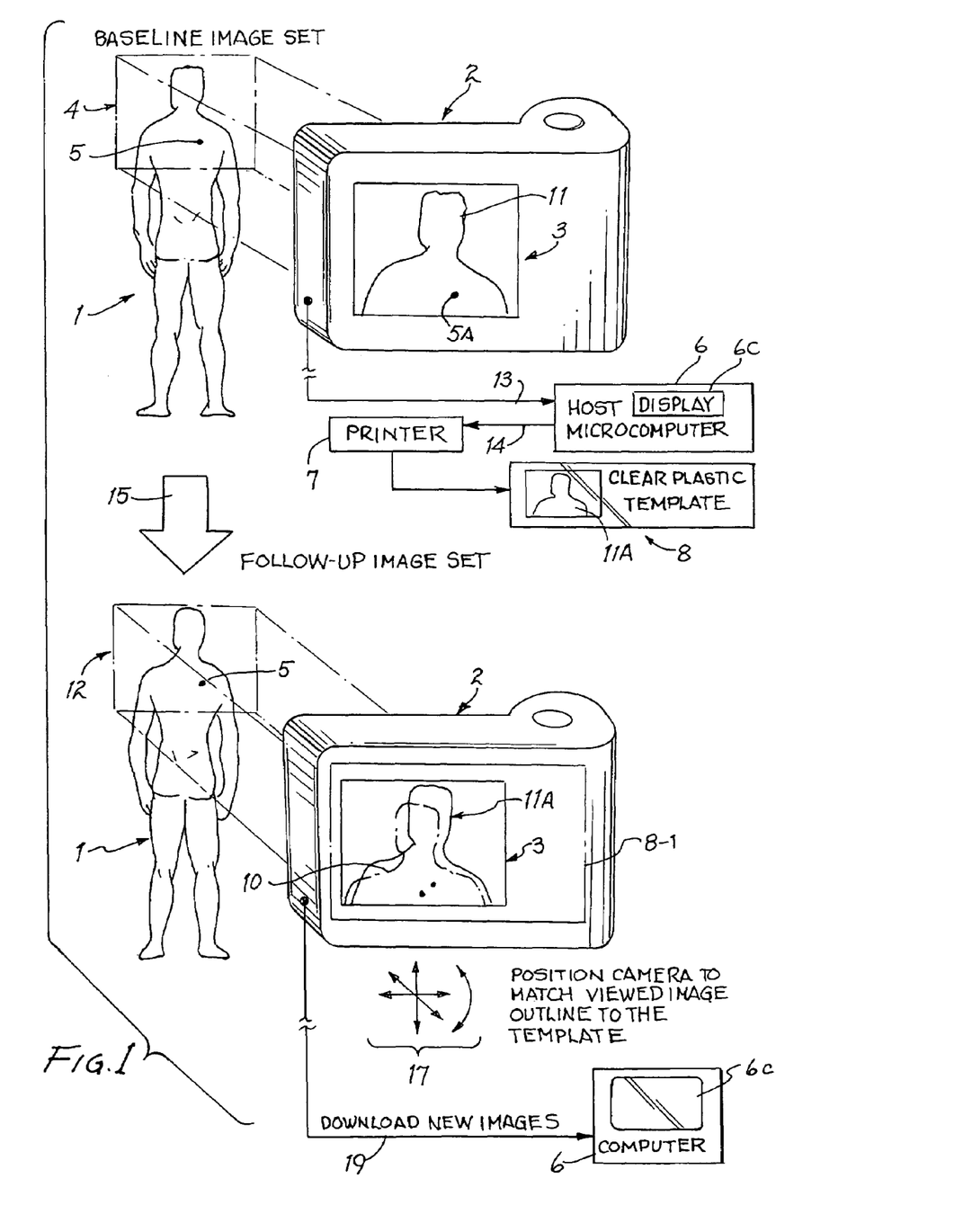
FIG. 1 is a perspective two-stage diagram illustrating the technique of using a digital camera to obtain a baseline image set of skin lesions and a follow-up "current" image set of skin lesions on the same body area.

FIG. 1 shows how one of the skin areas of a subject 1 are photographed using an ordinary digital camera 2 having an LCD viewfinder display 3 in order to acquire one of a set of "baseline images" for subject 1. The field of view (FOV) of digital camera 2 is indicated by a rectangle 4 which encompasses the head and shoulders of subject 1. An adhesive-backed blue circular calibration disk 5 having a precisely known diameter may be attached to the skin of subject 1 within the field of view 4. (Alternatively, the calibration disk 5 can be other than circular, and can be imprinted rather than adhesively attached on the body of subject 1 within the field of view.) If calibration disk 5 is not precisely perpendicular to the optical axis of the lens of digital camera 2, the image 5A of calibration disk 5 appears as an ellipse rather than a circle on the image 11 appearing on LCD viewfinder display 3. After the first baseline image has been digitally acquired by camera 2, additional baseline images of different skin areas for subject 1 are similarly acquired according to a framing protocol, subsequently described. After all of the baseline images have been acquired according to the framing protocol, the set of digital baseline images is downloaded as indicated by communications path 13 to a suitable computer 6, which may be an ordinary personal desktop or laptop computer having a display screen or monitor 6C. Computer 6 is coupled by a communications path 14 to a printer 7, which is capable of printing out a digitally processed set of the downloaded baseline images on a clear plastic template sheet 8. Reference numeral 11A indicates a digitally filtered representation of the first image 11 acquired by digital camera 2 printed on clear plastic template sheet numeral 11A.

Figure 5:
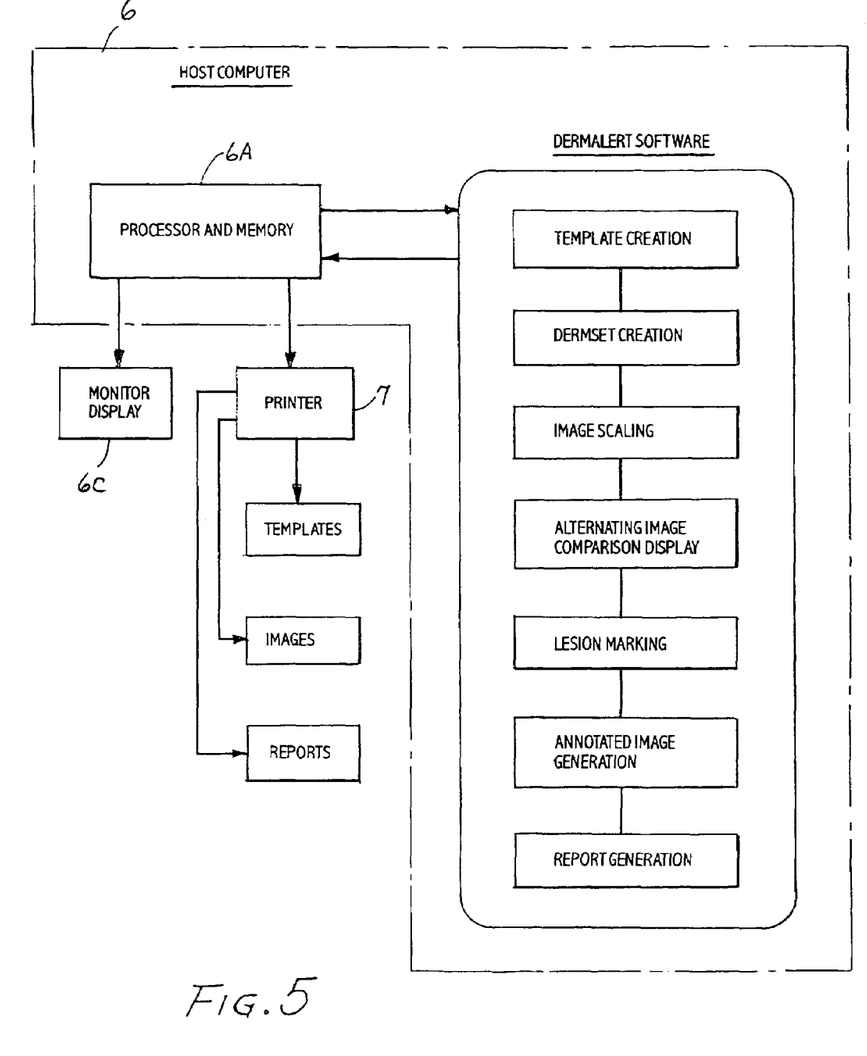
FIG. 5 is a block diagram useful in explaining the computer system utilized in accordance with the present invention.

FIG. 5 shows more details of computer 6. More specifically, computer 6 includes a processor 6A including associated memory, and also includes DERMALERT software 6B which is executed by processor 6A and is stored in its associated memory. DERMALERT software 6B includes software modules for template creation, DERMSET (subsequently explained) creation, image scaling, alternating image comparison display, lesion marking, annotated image generation, and report generation, as subsequently described.

The function of the DERMALERT software is to create the template 8 that is used to acquire the current images in good alignment with the corresponding baseline images. The baseline template image that is imprinted on template 8 is one of the outputs from computer 6 to the printer 7. The DERMALERT software also creates the "DERMSET", which is a term used herein to encompass both the subsequently described DERMSET folder and DERMSET.SET file. The DERMALERT program also is used to place the images that are to be examined into a DERMSET folder, and also is used to create the DERMSET.SET file, which describes the content of the DERMSET folder and also matches corresponding current and baseline images from the DERMSET. The DERMALERT software also performs an optional image scaling function, either by automatically finding the calibration disk or having it manually identified, and then performing the scaling of one image of a current image/baseline image pair relative to the other so as to make them match. Another function of the DERMALERT software is image translation, which includes rendering of one or both of the images of a current image/baseline image pair partially transparent or semi-transparent and allowing one image to be electronically "dragged" with respect to the other. Another function of the DERMALERT software is to perform a comparison of the images of a current image/ baseline image pair using the known alternating display technique as described in our above-mentioned '022 patent. Another function of the DERMALERT software is to allow images of changed lesions to be marked. The lesion marking program referred to involves placing a cursor over a changed lesion and clicking the mouse button, which causes a box to be drawn around the display of a lesion that has changed. The lesion marking program also provides information for the report generation function that is performed by the DERMALERT software. That allows a report to be output to the printer 7 to indicate the location of the lesion changes and the nature of the changes, e.g., whether a lesion is new or whether it has changed in size. The DERMALERT software also can send an annotated image or a raw image to the printer. A person therefore could take both a printed report and printed images of new and/or significantly changed lesions to the dermatologist.

Referring to FIG. 1, arrow 15 indicates passage of a substantial amount of time after the baseline image set is acquired and stored in computer 6 as explained above, after which a follow-up set of corresponding "current" images is to be acquired to determine if any existing lesions on the skin of subject 1 have significantly changed and to determine if any new lesions have appeared during the elapsed time 15. The arrangement in the lower portion of FIG. 1 below arrow 15 is substantially the same as in the upper portion of FIG. 1, except that printer 7 is not required. The scaled image 11A is cut out from plastic template sheet 8 to provide a baseline template 8-1 which is temporarily affixed over LCD viewfinder display 3 of digital camera 2. Then, camera 2 is oriented and rotated as indicated by arrow 17 so as to align the current image 10 of the head and shoulders of subject 1 with a the baseline template image 11A as closely as is practical. The calibration disk 5 identical to the one previously used in photographing the baseline images may be placed on the same relative area of the subject body. (Alternatively, as mentioned above, the calibration disk 5 may be imprinted on the body of subject 1 within the field of view.) The current image within the field of view 12 then is digitally photographed. This procedure is repeated for the same skin areas as each of the previously acquired baseline images, and once all of the desired current images have been acquired, they are downloaded as indicated by communications path 19 to computer 6.

Figure 2:
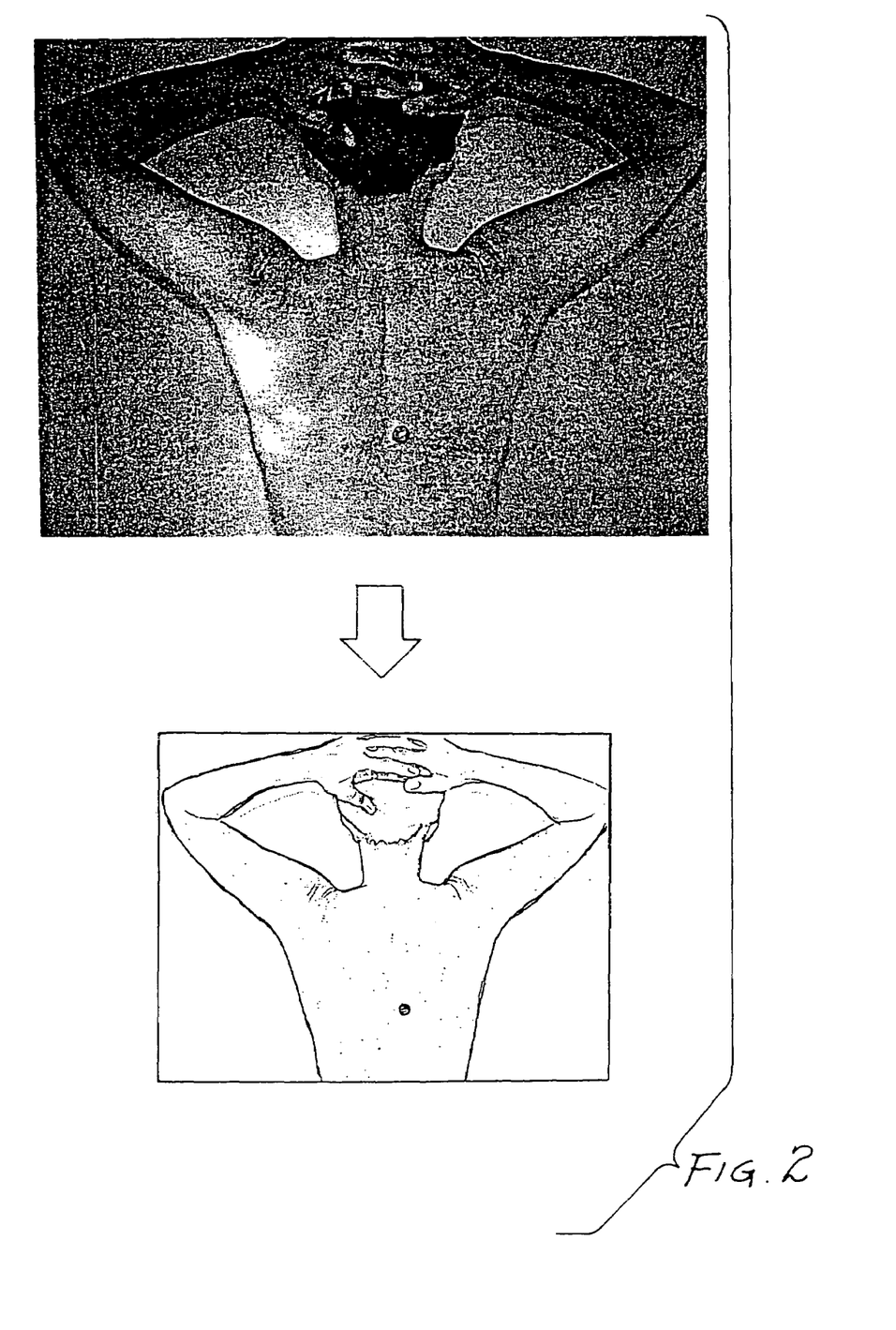
FIG. 2 shows a digital baseline image and a representation thereof which has been digitally filtered to enhance edges thereof to provide a mostly transparent template image to be scaled and placed over the viewfinder display of the digital camera to make the current image set.
Figure 3A:
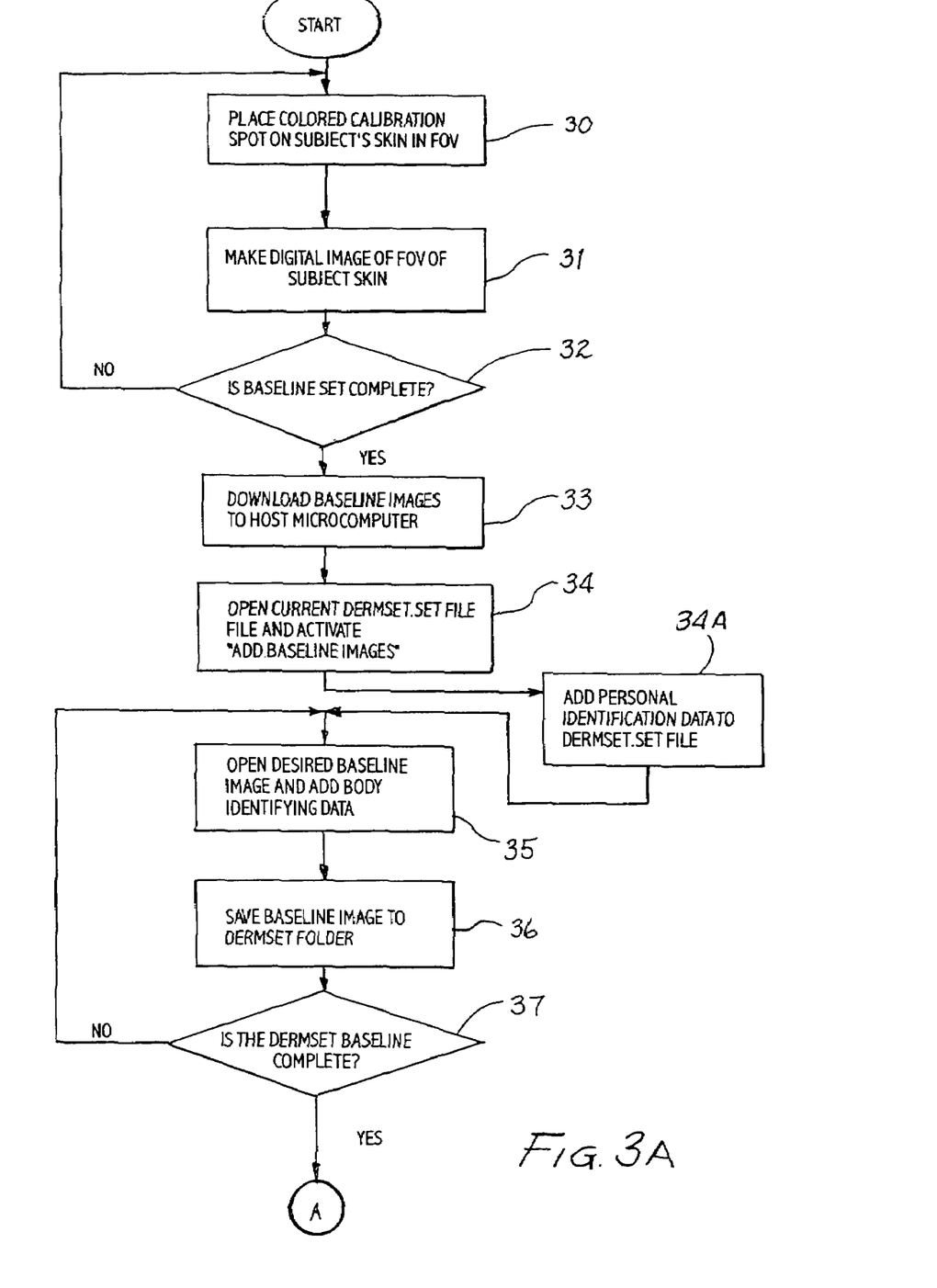
FIGS. 3A–3F constitute a flowchart of the procedure of the present invention, including steps performed by the computer 6 shown in FIG. 1.

Referring to FIGS. 1, 2 and 3A–E, a blue (or other suitable color) calibration target, which can be a circular disk 5 about 0.75 inches in diameter, with a self-adhesive back, is applied to the skin in the field of view of each image, as indicated in block 30 of the flowchart of FIG. 3A. (Alternatively, the calibration target could be imprinted on the subject's skin.) As indicated in block 31, a baseline set of digital images of the skin of a person or subject 1 is made using a an ordinary digital camera 2 which has a liquid crystal (LCD) or similar image viewfinder display 3. The baseline images are made using a user-defined image framing protocol, wherein a typical image frame or field of view (FOV) 4 is shown. The image framing protocol referred to can be a whole-body protocol which may include approximately 18 images of the subject's body, wherein each image slightly overlaps adjacent images, so that no portion of the subject's entire body is omitted from being digitally photographed when the image framing protocol is adhered to.

Briefly, a set of baseline images is made according to the above image framing protocol. That set of baseline images is downloaded from camera 2 as a number of baseline image files contained in a "baseline image folder" in computer 6. Later, a follow-up set of "current" images is made of the same subject, following the same image framing protocol, and those current images are stored as a particular set of current image files in a "current image folder".

There is a folder in computer 6 called the DERMSET folder. The DERMSET folder is a folder located anywhere in the computer that can be accessed by the above-mentioned DERMALERT program. The DERMSET folder is where the baseline and current images reside that have been selected for use by the DERMALERT program. When the baseline and current images are made with the digital camera 2, they are transferred to the computer into the baseline folder and the current images folder, respectively. A subset of that typically large number of baseline and current images usually has been selected to be operated upon by the DERMALERT program. That subset is what is placed in the DERMSET folder. A file called the DERMSET.SET file is a single, relatively short file created by the DERMSET software that contains patient identification information and a list of names assigned to the images that are associated as pairs which eventually are placed in the DERMSET folder. Thus, the DERMSET.SET file is a relatively small file that contains information regarding the content of the DERMSET folder in which the pairs of current/baseline images that are to be compared are placed.

Through the execution of the DERMALERT program, a set of matched pairs of baseline images and corresponding current images that are arranged according a predetermined protocol is stored in the DERMSET folder. In the DERMSET folder there are both baseline image files and current image files that may or may not represent all of the corresponding images that were in the baseline image folder and the current image folder, and instead may include only selected current images and corresponding baseline images. To place the images in the DERMSET folder, the first task is to load the baseline images, which is accomplished by going into the above-mentioned baseline image folder and selecting a baseline image that is desired to be presently used in the DERMALERT software and copying the selected baseline image into the DERMSET folder. In the course of the copying the desired image into the baseline DERMSET folder, the corresponding region of the subject's body is identified and stored in the DERMSET.SET file from which the information can be retrieved. This process is repeated until all of the desired baseline images are placed in the DERMSET folder and recorded in the DERMSET.SET file. The second task is to assign current images to matching baseline images and copy the current images to the DERMSET folder. To accomplish this, the above mentioned "current images folder" is accessed and the images from that image set are matched to appropriate baseline images which have already been placed in the DERMSET folder. When the DERMSET.SET file is opened by the DERMALERT program, a set of body regions previously recorded is presented for viewing, and the DERMALERT software responds to "clicking" on one of the body regions by selecting the desired baseline image and its corresponding current image and displaying them both as prescribed by the DERMALERT program.

If a corresponding template having printed thereon a transparent or semi-transparent digitally filtered representation of the corresponding baseline image has been used properly in making the current image, the current image and the baseline image will be fairly well registered, i.e., aligned with each other, when the body region is selected for viewing. The DERMALERT software includes a "click and drag" routine that allows further "fine tuning" of the registration/alignment of the corresponding baseline images and current images by making both the baseline image and the corresponding current images transparent or semi-transparent so that both can be viewed simultaneously. The operator can click on one of the images and drag it slightly relative to the other image to more precisely align them.

Furthermore, scaling of one of the images of a matched pair can be accomplished by using the DERMALERT software to determine the relative lengths of the elliptical axes of the images of the calibration disks 5 appearing in each image. One option that can be selected to accomplish the scaling operates automatically to locate the calibration disk 5 within each image, extract the needed information regarding their elliptical axes, and then re-scale one of the baseline image and current image with respect to the other. Another option is to manually identify the location of the calibration disk 5 in each image before the lengths of the elliptical axes are determined. In addition, the images may be scaled so that the images have the same pixel dimensions. This may be necessary if the camera used to obtain the current images is different from the one used to make the baseline images.

Once the baseline image and corresponding current image are aligned, the alternating display routine that is activated can be identical to the one described in the above incorporated-by-reference '022 patent.

The DERMSET folder contains each baseline image and each current image. If the operator selects a particular body region, the DERMALERT software automatically brings up the appropriate baseline image and current image, which are fairly closely scaled in size and are fairly well aligned with each other. The DERMALERT software provides a capability of "grabbing" the current image and "dragging" it relative to the baseline image and also produces the capability of scanning over the entire image with a small movable "window" to facilitate achieving close alignment of the "local" portions of the current and baseline images within the window. As soon as the baseline image and the current image are suitably aligned, the DERMALERT software can be instructed to display the full corresponding baseline image and alternately display the baseline and current images as desired so as to cause any skin lesion changes that have occurred since baseline image was made to become readily visible. The movable window can be moved by means of the cursor to another area of the two images, and the portions that appear within the window can be re-aligned as described above, if desired.

Referring again to FIG. 3A, the foregoing procedure is repeated in accordance with the determinations of decision block 32 until all of the desired baseline images have been obtained according to the selected imaging protocol. As indicated in block 33, the baseline digital images are downloaded from camera 2 to the baseline image folder in computer 6, using download software specific to the particular camera being used. The downloading software ordinarily is provided by the digital camera manufacturer and supplied with the digital camera when it is purchased. From that baseline image folder a subset of the baseline images may be selected and placed in the DERMSET folder. (Another approach would be to download the baseline images from digital camera 2 directly into the DERMSET folder.) Similarly, the above described embodiment downloads the current images from camera into the current image folder, from which the images that will eventually go into the DERMSET folder are selected. (Again, the current images could be downloaded directly from camera 2 into the DERMSET folder.)

As indicated in block 34, the DERMSET.SET file is opened in the DERMALERT software and a feature called "Add Baseline Images" is activated.

The DERMALERT software operates to allow creation of a DERMSET folder containing matched baseline and current set of images which are reasonably closely aligned as a consequence of the template controlled imaging protocol described herein. The DERMALERT software also creates a DERMSET.SET file which contains patient or user information, in addition to information on specific images saved to the DERMSET folder. An option of providing higher precision scaling is accomplished by the DERMALERT program by locating a calibration target in each image and automatically re-scaling one of the images of a matched pair relative to the other image as needed. The DERMALERT software also can scan the baseline images and the current images to locate therein the images of the colored calibration disks 5 and compute the lengths of their major or minor axes, and, based on the ratios thereof, slightly rescale one of the images to more precisely match the display of the image of the other. The DERMALERT program also enables higher precision "local" re-registration or re-alignment of the two images of a current image/baseline image pair by temporarily rendering the images transparent and allowing one image to be shifted with respect to the other until more precise alignment of local features of interest is achieved. Finally, the DERMALERT program effectuates ultimate display of the images of a current image/image pair, fieldof-view adjustment, changed-lesion tagging, report generation, and printing out of baseline template images.

The program goes from block 34 to block 34A and adds personal identification information to the DERMSET.SET file, and then goes to block 35. In block 35, the program opens the desired baseline image and adds body-identifying data to it to identify which regions of the subject's body the various baseline images represent. As indicated in blocks 35–37, the desired digital baseline images are opened one-by-one, the corresponding body region for each baseline image is identified, and the desired images are saved in the Current DERMSET folder as a baseline image file. The above-mentioned DERMSET.SET file is a file having a specific format containing (1) personal information associated with the images, (2) the number of body regions imaged, (3) the name of each body region imaged, (4) the name of the image file for baseline images for each body region, and (5) the name of the current image file for each body region. When all of the desired baseline images are saved in this manner, the program goes via label "A" to block 38 of FIG. 3B and saves the DERMSET.SET file.

Figure 3B:
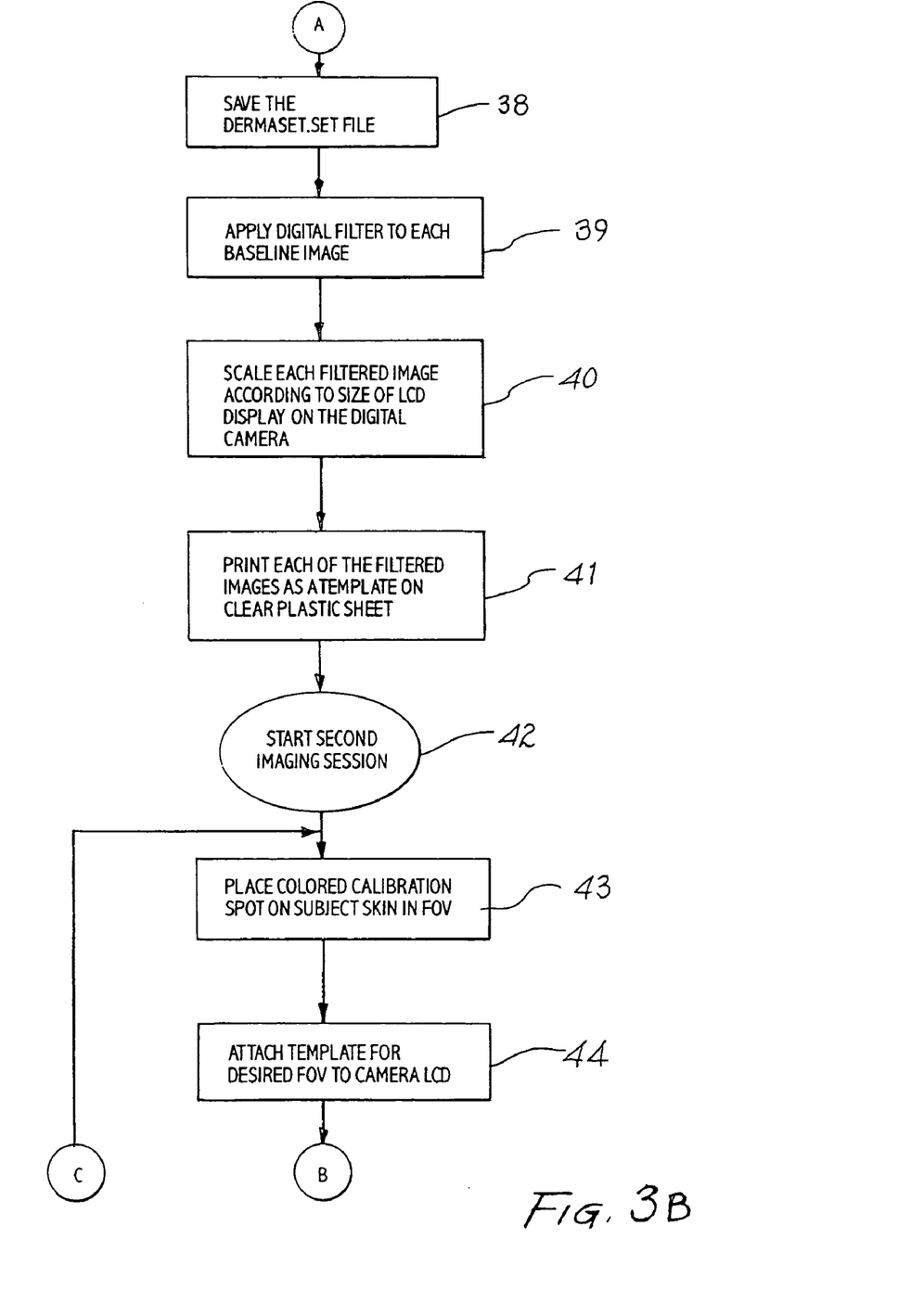

Each baseline image is then filtered by a digital filter that operates to enhance the edges of that image or otherwise process it so as to emphasize the outlines or major features of interest in the image, as indicated in block 39 by making the rest of image transparent or relatively transparent. (Alternatively, the digital filtering could be performed differently so as to make the baseline image semi-transparent, without necessarily enhancing the edges only and making the rest transparent or semi-transparent, so as to allow one of the images to be seen through the other image and distinguished from it and electronically "dragged" relative to it. As indicated in block 40, the boundary of each image is defined by a "box" that is scaled to correspond to the exact size and shape of the LCD viewfinder display 3 for the particular digital camera 2 being used to make the various current images.

Referring to block 41, the above-mentioned templates 8 may be made by making template images in the following manner (although the templates also could be made in other ways.) First, a copy called the "working image" is made of the original baseline image stored in the memory of computer 6. The working image is converted to a greyscale image by calculating a greyscale value for each pixel from the red (r), green (g), and blue (b) values of each pixel in the color image, where $$\text{greyscale value} = (30*r + 59*g + 11*b)/100.$$

The working image then is converted to a "variance image" by replacing the greyscale value of each pixel with the root mean square of the difference between the value of that pixel and the value of its surrounding pixels.

Each baseline image which has been processed as described above is then scaled to an output size consistent with the size of the LCD of digital camera 2. The scaling information and the size and format of the LCD viewfinder display screen for all of the commonly available digital cameras is stored in computer 6, and the DERMALERT software allows this information to be accessed by simply "clicking" on the make and model of the digital camera 2 presently being used. (Alternatively, a customized viewfinder display screen size and format may be provided to the software by the user.) The appropriately scaled baseline images which have been processed as described above preferably then are printed on a sheet of transparent plastic or other similar transparent material by means of printer 7 in order to provide scaled templates on template sheet 8 in FIG. 1, which can be cut out and precisely fit over the LCD viewfinder display 3 of camera 2.

This allows a later "current" (i.e., "live") image of the same portion of the subject's skin to be conveniently viewed through and precisely aligned with the digitally filtered outline of the corresponding baseline image and then digitally photographed to provide a pair of digital baseline and current images of the same area of the subject's skin. Thus, corresponding current images of various areas of the subject's body can be conveniently made by using only an ordinary digital camera 2, an ordinary personal computer 6 that contains the above described DERMALERT software and the printer 7, and transparent plastic sheet on which to print the baseline image templates 8.

The upper part of FIG. 2 shows a copy of a digital photograph that constitutes a baseline image of the back portion of the person's upper body, and the lower part of FIG. 2 also shows a corresponding "digitally filtered image" of that same baseline image, which, when scaled to fit over the viewfinder display of the digital camera being used to photograph a corresponding current image, is printed on transparent sheet material to form a template.

Referring again to FIG. 3B, a later "current" imaging session then can be performed, as indicated by label 42. As indicated in block 43, a blue (or otherwise appropriately colored) calibration target, which can be the above mentioned circular disk 5 having a diameter of about 0.75 inches, with self-adhesive backing, is applied to the subject's skin in the field of view of each image. During the second imaging session, each of the previously stored baseline images is replicated for the same subject 1, using each respective template 8 as shown in FIG. 1 as a guide to assist in duplicating each baseline image. This is accomplished by affixing a particular template 8-1 (FIG. 1), which has been cut out from transparent plastic template sheet 8, to LCD viewfinder display 3 of the camera 2 as indicated in block 44.

Figure 3C:
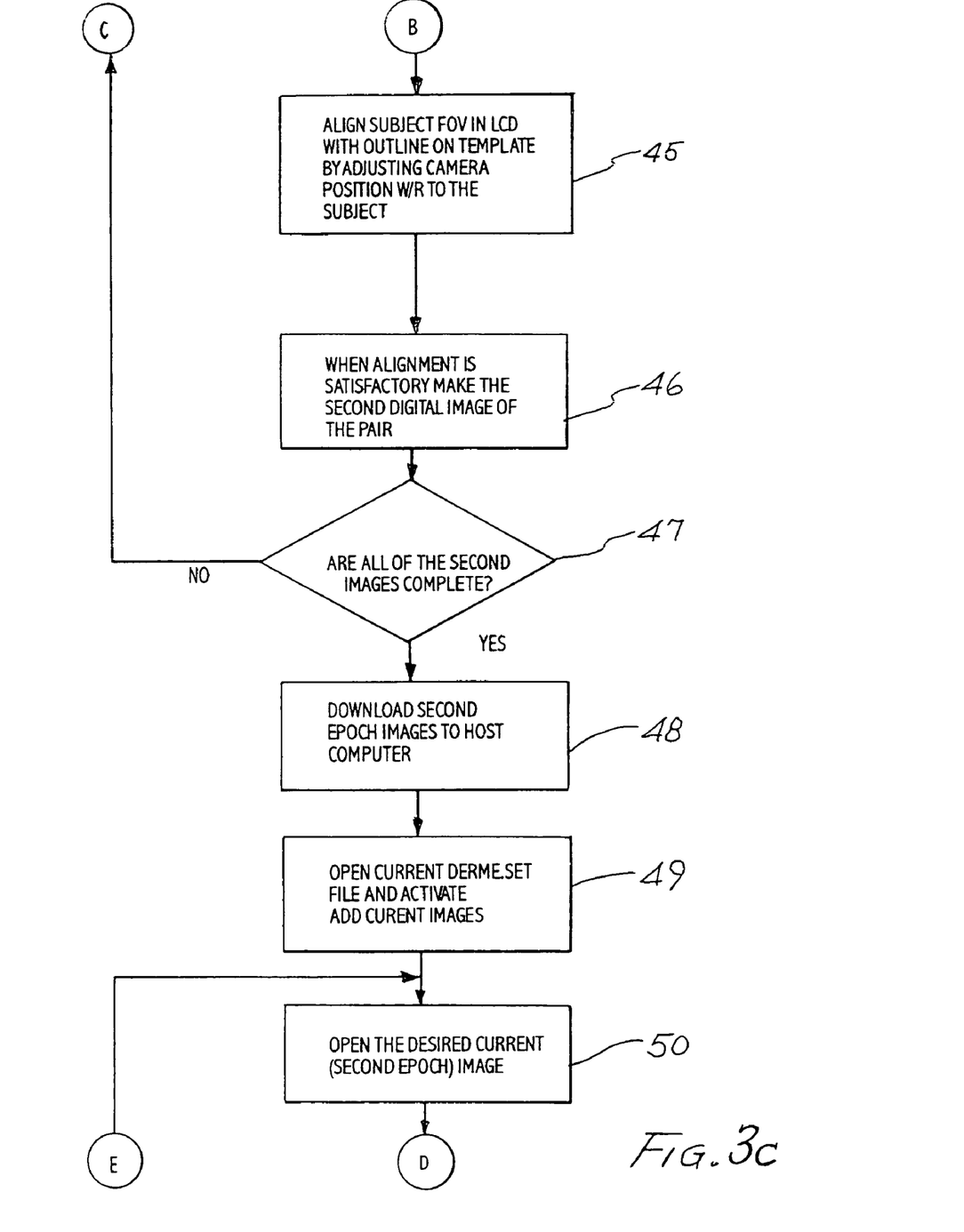

The program then goes to FIG. 3C via label "B". The "live" scene being imaged in the field of view 12 of the LCD viewfinder display 3 then is viewed through the transparent or semi-transparent template 8-1 and the outline of the corresponding baseline image on template 8-1. In this way, the outline of baseline template image 11 on the template 8-1 can be easily aligned with the live view 10 of the scene within the field of view 12 being imaged and digitally photographed by camera 2 by adjusting the location and orientation of camera 2 relative to subject 1.

As indicated in block 45 of FIG. 3C, the view 10 in LCD viewfinder display 3 is closely aligned with the enhanced baseline template image 11 printed on template 8-1. As indicated in block 46, when the alignment is achieved to the satisfaction of the user, a new still digital current image is made. As indicated in decision block 47, the foregoing procedure is repeated by returning to the entry point of block 43 of FIG. 3B via label "C" until all desired baseline images have been replicated as new "current" images. The set of current images then is downloaded to the current images folder in computer 6 in anticipation of putting them into the DERMSET folder, as indicated in block 48.

Next, as indicated in block 49 of FIG. 3C, the DERMSET.SET file in the DERMALERT software is opened, and an "Add Current Images" feature thereof is activated. Then, as indicated in block 50, the desired current digital images are opened one-by-one.

Figure 3D:
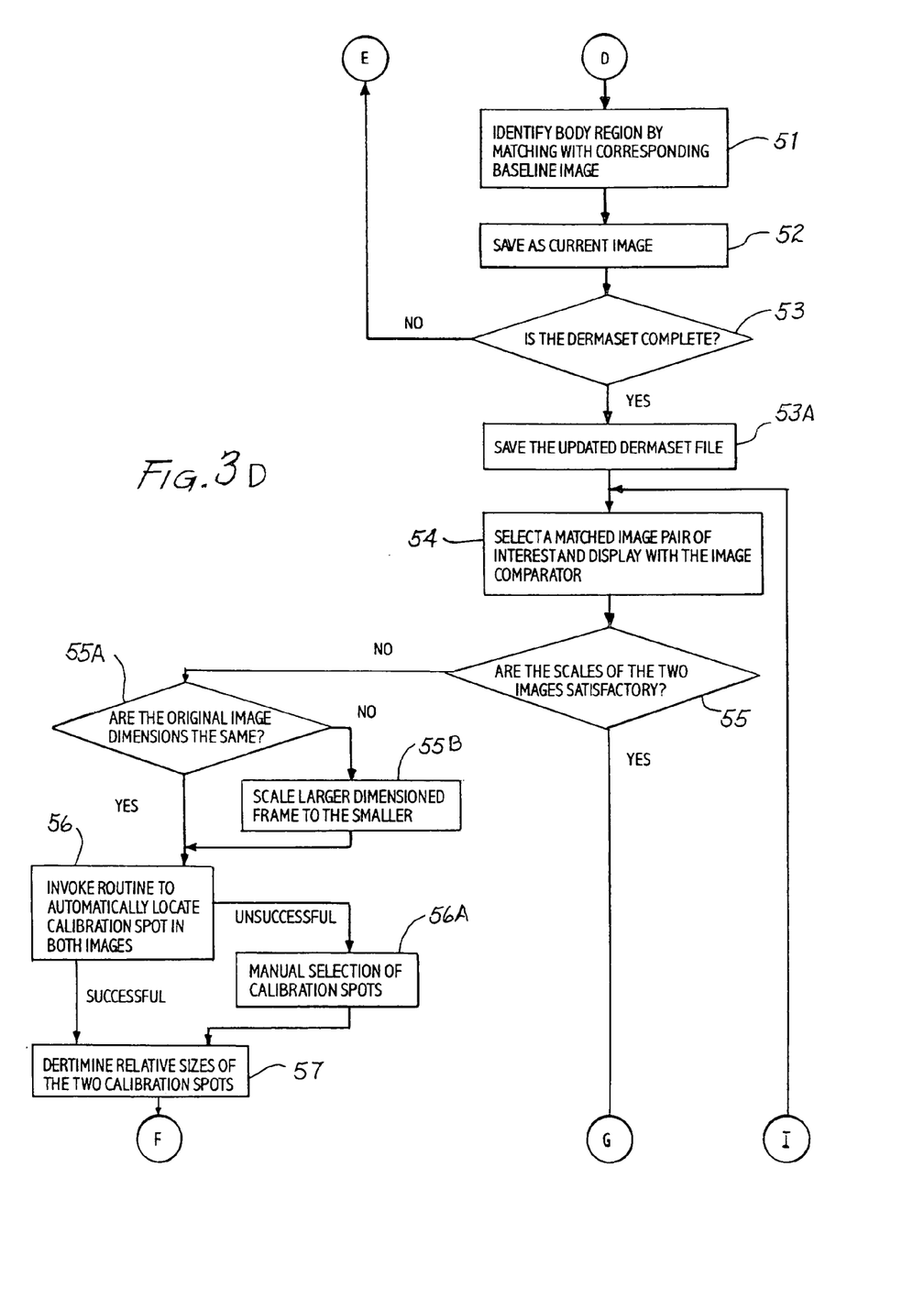

The program then goes to FIG. 3D via label "D". As indicated in block 51 of FIG. 3D, the subject's body region is identified by matching its identification information with the identification information of the corresponding baseline image. Then, as indicated in block 52, the image is saved as a current image to the DERMSET folder and the identifying information is recorded to the DERMSET.SET file. As indicated in decision block 53, the foregoing procedure is repeated until all of the desired current images are added to the DERMSET folder. As indicated in block 53A, when the determination of decision block 53 is affirmative, the DERMSET. SET file is saved with the current image identification information.

The process described above results in matched sets of digital images of the skin which are generally already suitable for use in the DERMALERT image comparison software. As indicated in block 54, the image comparison software is utilized to alternately display the selected baseline image and corresponding current image on computer display 6C at a user-selected display frequency to assist in visual identification of new lesions or changed features in existing lesions in the manner briefly described below and described in more detail in our above mentioned U.S. Pat. No. 6,427,022.

As indicated in decision block 55, in some cases it may be desirable to further improve the registration/alignment between the baseline image and a corresponding current image. If the baseline and current images of an image pair were obtained at sufficiently different distances from the subject's skin that the scales of the two images do not match satisfactorily, the calibration disks 5 which were affixed to the skin can be used to automatically rescale one of the images to better match the other. If the determination of decision block 55 is affirmative, the program goes via label "G" to decision block 59 of FIG. 3E. If the determination of decision block 55 is negative, several options are available. It may be that the digital camera used to photograph the baseline images is different than the camera used to photograph the corresponding current images. If the determination of decision block 55 is negative, the program goes to decision block 55A and determines whether the original baseline image dimensions are the same as the current image dimensions. If that determination is negative, then the program goes to block 55B and scales the larger dimensioned image to the other one and then goes to block 56. If the determination of decision block 55A is affirmative, then program goes directly to block 56. In block 56 the program attempts to automatically locate the calibration disks (or spots or other calibration indicia) in both the baseline image and the corresponding current image. If that attempt is successful, the program goes directly to block 57, and if it is not successful, the program goes to block 56A and prompts manual location of calibration disks by means of a cursor, and then the program goes to block 57. The program then goes to block 58 of FIG. 3E via label "F".

A routine in the software uses conventional techniques to identify the edges of the images of the calibration disks 5, and also to determine the length of its major axis if the calibration disks 5 on an area of the body are tilted away from camera 2, and hence accurately determines the size of the disks 5 in pixel units. Since its linear dimension is known, a scale for the image is established. This procedure is repeated for the matching image in the pair, and the one of the two images can be rescaled so that the two images have the same scale, as indicated in block 58 of FIG. 3E. This significantly improves the registration/alignment of the baseline image and a corresponding current image.

Figure 3E:
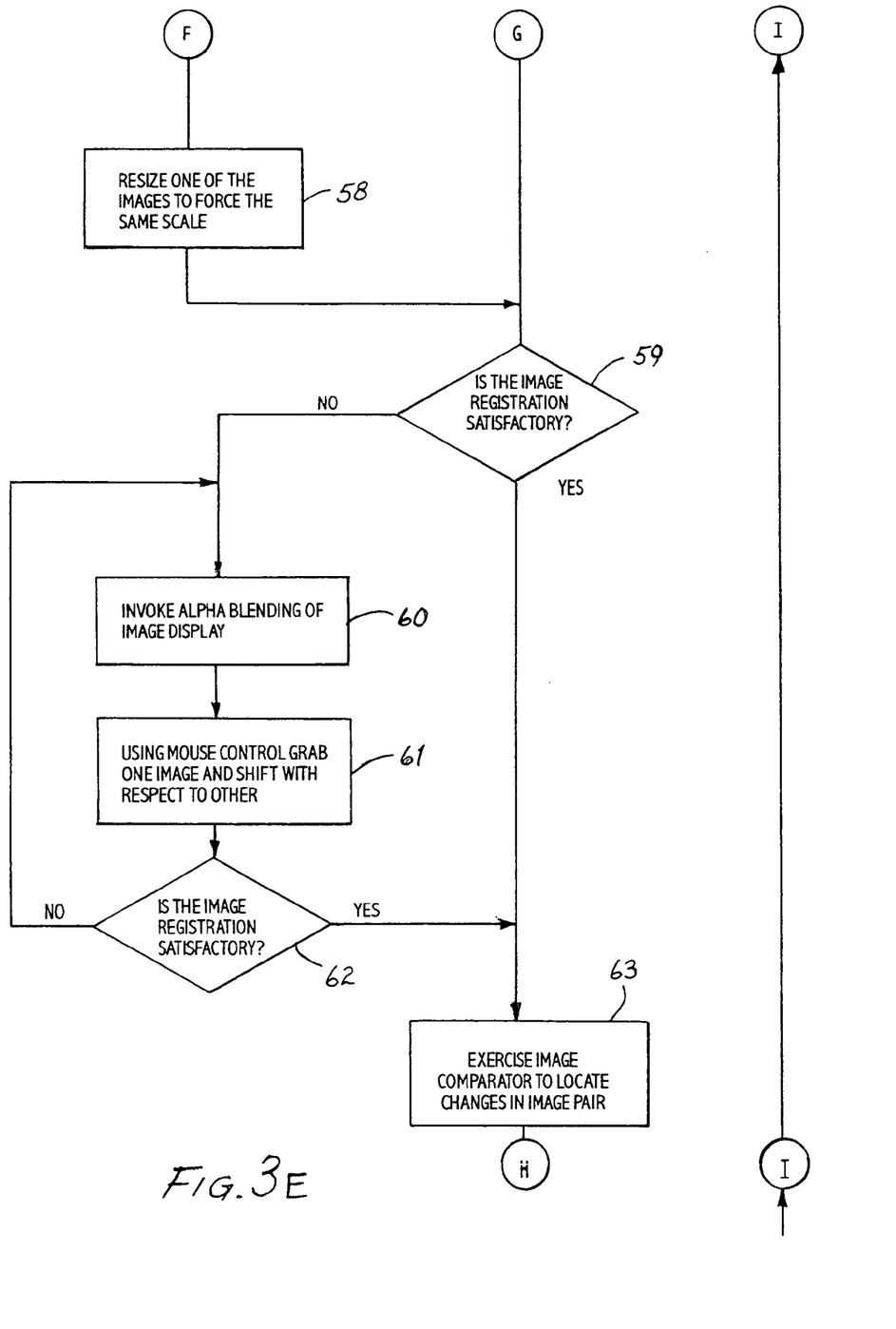

As indicated in decision block 59 of FIG. 3E, if the image registration/alignment is still not to the user's satisfaction, another image matching procedure can be performed, as indicated in blocks 60 and 61. In this case, as indicated in block 60, an image is displayed that is the result of "alpha blending" of the two images (i.e., creating a view that appears to be a combination of a 50% opacity version of the original images). The consequence of this process is that each of the baseline image and the current image can be seen through the other. Then, one of the images can be "grabbed" using a mouse and shifted with respect to the other until corresponding features of the two images appear to coincide on the display, as indicated in block 61. If the image registration/alignment obtained in this manner is determined to be satisfactory in decision block 62, the two images can be returned to their normal state, and can be alternately viewed using the image comparator technique as described in our above mentioned previous U.S. Pat. No. 6,427,022. If the determination of decision block 62 is that the image/alignment still is unsatisfactory, the procedure of blocks 60 and 61 can be repeated.

Figure 3F:
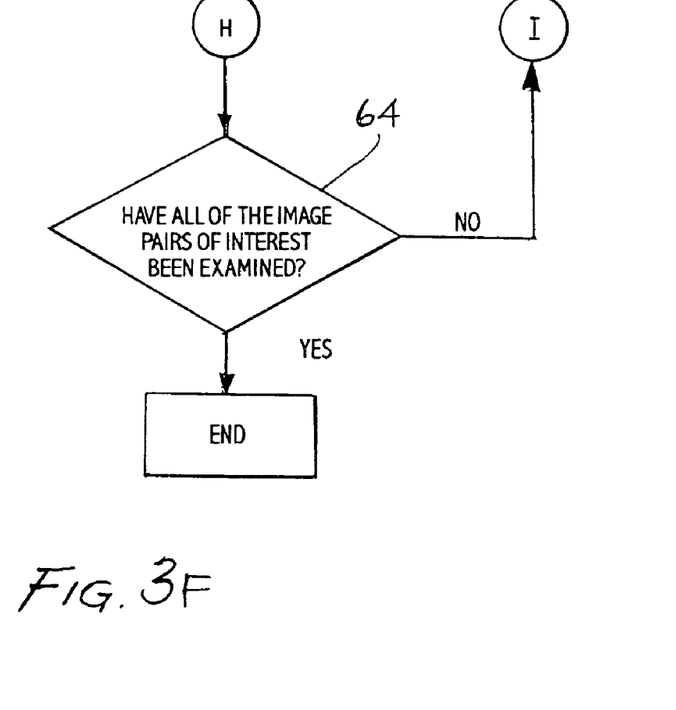

As indicated in block 63, the above mentioned alternate image display and comparison program may be initiated by the DERMALERT software to alternately display the selected baseline image and current image on the display 6C of computer 6. The program then goes via label "H" to decision block 64 of FIG. 3F. As indicated in decision block 64, the foregoing procedure is repeated by returning via label "I" to the entry point of block 54 of FIG. 3D for every area of interest of the subject.

Figure 4:
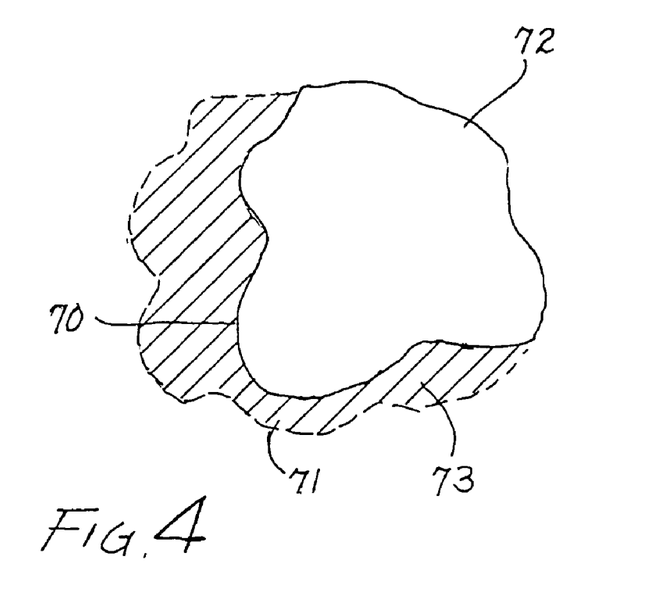
FIG. 4 is a diagram of a baseline image of a skin lesion superimposed on a present image of the same lesion.

Referring to FIG. 4, reference numeral 70 indicates the outline of the baseline image data of a typical lesion 72. Reference numeral 71 indicates the outline of an up-to-date or current image of the same lesion, typically obtained a few months to a few years later. In the example of FIG. 4, the up-to-date lesion image 71 is larger than the baseline image 70. The cross hatched area 73 indicates the areas in which the lesion has grown since the baseline image 70 was obtained.

Thus, a basic aspect of the invention is the generation of a semi-transparent baseline image template that can be placed over the viewfinder display of a digital camera to align the current image with a corresponding baseline image represented by the semi-transparent baseline image appearing on the template. An optional aspect or refinement is to use a calibration spot in the current image and corresponding baseline image to automatically scale the current image with the corresponding baseline image, especially if the initial template-based alignment is less than fully satisfactory. Use of the calibration spot becomes especially useful if the digital camera used to make the current images is significantly different than the digital camera used to make the corresponding baseline images. Another optional aspect or refinement is causing one of the baseline and corresponding current images to be semi-transparent and providing the capability of "dragging" the one relative to the other, which allows extremely precise alignment/registration of corresponding local areas of the corresponding current and baseline images.

The above technique for scaling and aligning the up-to-date or current images of the subject with his/her corresponding baseline images enables the use of the alternating display image comparison technique resulting in very accurate determination of which lesions have newly appeared and very accurate determination of which ones have grown significantly relative to the corresponding baseline images. Even though alignment and scaling between alternately displayed baseline images and corresponding up-to-date images is never perfect, the changed appearance is slight or non-existent for lesions which have not significantly grown. However, if a new lesion appears, or if there has been substantial growth of a preexisting lesion, the blinking, which corresponds to a change in size between the outline 70 and the outline 71 in FIG. 4, is quite dramatic and easily interpreted to indicate which lesions should be promptly observed by a dermatologist. This technique has been shown to be far superior in detecting new or changed lesions than presently accepted competing techniques of skin self-examination in mirrors or side-by-side comparison of photographic images.

By way of definition, the term "alternating display image comparison" is intended to refer to either the process of alternately displaying approximately registered images that differ in size and/or shape or to the phenomenon whereby features of the alternately displayed images are sufficiently different that they identify a significant change in one of the lesions or presence of a new lesion. That is, the term means the alternate displaying of the lesions or features to cause them to appear to flash or pulsate so as to indicate that the lesions or features vary in size, shape, or presence enough to identify a significantly growing (or shrinking) lesion or the presence of a new lesion feature.

Also by way of definition, the term "current image" or "current image data" is intended to refer to any corresponding image or image data obtained after the baseline image.

Use of the described template technique avoids the need to utilize a measuring tape or the like to obtain the correct camera distance from the subject's skin and also avoids alignment difficulties of our previous system described in the '022 patent.

Thus, the present skin lesion imaging system is entirely digitally based, and avoids the need for the cost and time required for the previously required film processing. The necessary accurate alignment of baseline and current images can be achieved easily by personnel photographing the current images of the subject's body using an ordinary digital camera without any need for photography and/or film processing services by skilled third parties.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

For example, the template can include any kind of fiducial marking that allows the current image to be a aligned with a corresponding baseline image. The above described technique of obtaining a digitally filtered outline of the true baseline image wherein most of the digitally filtered outline image is transparent or semi-transparent is just one way of obtaining a template for use in aligning the current image with its corresponding baseline image during the process of using a digital camera to photograph the current image. For example, The baseline image template could include a semi-transparent representation of the baseline image through which the "live" corresponding current image is visualized to alignment to the baseline template image prior to capturing the digital photograph of the current image. Another possible approach would be to provide a number of spots on well-defined locations of the subject's body for both the baseline images and the corresponding current images, and align the spots in the live current image with corresponding spots in the baseline template image.

Also, someone could accurately photograph the subject's entire body and then performing the above described technique from the photographs of the subject's body rather than the actual subject's body. Furthermore, some cameras, such as press cameras, utilize a ground glass screen, and use one lens system to image the scene being photographed onto photographic film and another lens system to image the scene onto the ground glass screen, and which case the ground glass screen would be somewhat analogous to the LCD viewfinder display on a conventional digital camera. A simple template could be aligned over the ground glass screen and used to alignment the current image being photographed with a prior baseline image of the same subject matter.

Also, the digital images could be transferred directly from the digital camera to the DERMALERT software or similar/analogous software.

What is claimed is:

1. A method of identifying new or significantly changed skin lesions, comprising:
   (a) providing digital baseline image data of an area of a subject's skin, by performing the steps of
      i. positioning a digital camera to frame the area within a field of view of the camera and digitally photographing the area to produce a digital baseline image of the area, and
      ii. downloading the digital baseline image from the camera to a computer;
   (b) operating the computer to produce a partially transparent or semi-transparent baseline image that is scaled to fit over a display of the camera;
   (c) operating a printer to print the baseline image on a relatively transparent sheet to produce a baseline image template;
   (d) providing digital current image data of the area of the subject's skin a substantial amount of time after step (a), by performing the steps of
      i. placing the template over the display of a digital camera which may be the same as or different than the digital camera of step (a)(i),
      ii. positioning that digital camera to frame an area within the field of view of that digital camera so as to align a current live image of the area with the baseline image on the template, and digitally photographing the area to produce a digital current image of the area, and
      iii. downloading the digital current image from that digital camera to the computer; and
   (e) operating the computer to alternately display the aligned current image data and the baseline image data on a monitor coupled to the computer to aid visual identification of lesions which are new or have significantly grown.

2. The method of claim 1 wherein step (a) includes operating the computer to digitally filter the baseline image to sharply enhance an aspect of the baseline image in order to provide a baseline template image, the method including printing the baseline template image on transparent sheet material to provide the template.

3. The method of claim 1 wherein step (a) includes providing a calibration indicia on the area before performing sub-step (i) and wherein step (d) includes providing a corresponding calibration indicia on the area before performing sub-step (ii) and scaling one of the baseline image and the current image to match the other based on relative values of a dimension of the calibration indicia in the baseline image and a corresponding dimension of the corresponding calibration indicia in the current image.

4. The method of claim 1 wherein step (a) includes making a plurality of baseline images of a plurality of peripherally overlapping areas, respectively.

5. The method of claim 4 wherein the peripherally overlapping areas encompass at least a substantial portion of the subject's skin.

6. The method of claim 4 wherein step (b) includes providing a plurality of partially transparent or semi-transparent current images for at least some of the peripherally overlapping areas for which baseline images are made in step (a).

7. The method of claim 3 wherein the calibration indicia and corresponding calibration indicia each include a thin adhesive-backed disk.

8. The method of claim 2 wherein the digital filtering includes enhancing edges and/or outlines of features of the baseline image and making other portions of the baseline image partially transparent or semi-transparent.

9. The method of claim 1 wherein the digital camera recited in step (d)(I) is the same as the digital camera of step (a)(i).

* * * * *